US008530108B2

(12) United States Patent
Kabumoto et al.

(10) Patent No.: US 8,530,108 B2
(45) Date of Patent: Sep. 10, 2013

(54) COMPOSITE MEMBRANE, FUEL CELL AND METHOD OF MAKING COMPOSITE MEMBRANE

(75) Inventors: Hiroki Kabumoto, Osaka (JP); Takashi Yasuo, Osaka (JP); Gerard F McLean, West Vancouver (CA); Jeremy Schrooten, Mission (CA)

(73) Assignee: Societe BIC, Clichy (FR)

( * ) Notice: Subject to any disclaimer, the term of this patent is extended or adjusted under 35 U.S.C. 154(b) by 708 days.

(21) Appl. No.: 12/703,033

(22) Filed: Feb. 9, 2010

(65) Prior Publication Data

US 2011/0195336 A1     Aug. 11, 2011

(51) Int. Cl.
*H01M 2/24* (2006.01)
*H01M 8/10* (2006.01)

(52) U.S. Cl.
USPC ........... 429/479; 429/405; 429/465; 429/471; 429/480; 429/505; 429/508; 429/534; 429/491; 429/104; 429/126; 429/304; 429/158

(58) Field of Classification Search
USPC ................. 429/405, 465, 471, 480, 505, 508, 429/534, 479
See application file for complete search history.

(56) References Cited

U.S. PATENT DOCUMENTS

| 7,632,587 | B2 | 12/2009 | Mclean et al. | |
| 2004/0151961 | A1* | 8/2004 | Morishima et al. | 429/32 |
| 2006/0029860 | A1* | 2/2006 | Ketcham et al. | 429/209 |
| 2008/0261088 | A1 | 10/2008 | Cha et al. | |

FOREIGN PATENT DOCUMENTS

| JP | 2007-536713 A | 12/2007 |
| JP | 2008-262909 A | 10/2008 |

* cited by examiner

*Primary Examiner* — Krishnan S Menon
*Assistant Examiner* — Allison M Gionta
(74) *Attorney, Agent, or Firm* — Schwegman Lundberg & Woessner, P.A.

(57) ABSTRACT

A fuel cell includes membrane electrode assemblies disposed in a planar arrangement. Each membrane electrode assembly includes an electrolyte membrane, an anode catalyst layer, and a cathode catalyst layer disposed counter to the cathode catalyst via the electrolyte membrane. Interconnectors (conductive members) are provided on the lateral faces of the electrolyte membranes disposed counter to each another in the neighboring direction of the membrane electrode assemblies. Each interconnector includes a support portion protruding toward the central region of the electrolyte member on the cathode side of the electrolyte membrane. The support portion is in contact with the cathode-side surface of an edge of the electrolyte membrane, and the electrolyte membrane is held by the support portion.

13 Claims, 12 Drawing Sheets

COMPOSITE MEMBRANE, FUEL CELL AND METHOD OF MAKING COMPOSITE MEMBRANE

BACKGROUND OF THE INVENTION

1. Field of the Invention

The present invention relates to a fuel cell. More particularly, the invention relates to a fuel cell with its cells disposed in a planar arrangement.

2. Description of the Related Art

A fuel cell is a device that generates electricity from hydrogen and oxygen so as to obtain highly efficient power generation. A principal feature of a fuel cell is its capacity for direct power generation which does not undergo a stage of thermal energy or kinetic energy as in conventional power generation. This presents such advantages as high power generation efficiency despite the small scale setup, reduced emission of nitrogen compounds and the like, and environmental friendliness on account of minimal noise or vibration. A fuel cell is capable of efficiently utilizing chemical energy in its fuel and, as such, is environmentally friendly. Fuel cells are therefore envisaged as an energy supply system for the twenty-first century and have gained attention as a promising power generation system that can be used in a variety of applications including space applications, automobiles, mobile devices, and large and small scale power generation. Serious technical efforts are being made to develop practical fuel cells.

In particular, polymer electrolyte fuel cells feature lower operating temperature and higher output density than the other types of fuel cells. In recent years, therefore, the polymer electrolyte fuel cells have been emerging as a promising power source for mobile devices such as cell phones, notebook-size personal computers, PDAs, MP3 players, digital cameras, electronic dictionaries or electronic books. Well known as the polymer electrolyte fuel cells for mobile devices are planar fuel cells, which have a plurality of single cells arranged in a plane.

In the conventional planar fuel cells, a process where a membrane is formed from the electrolyte solution using a cast method is mainly used in the formation of electrolyte membranes. There is a problem to be solved when the electrolyte membrane is formed using the cast method. If the application of electrolyte solution is nonuniform, holes may be created in the electrolyte membrane, and there may be some regions where an electrolyte membrane is not formed at all. Thus the problem of reduced reliability of a fuel cell needs to be addressed.

SUMMARY OF THE INVENTION

The present invention has been made in view of the foregoing problems, and a purpose thereof is to provide a composite membrane by which to improve the reliability of a planar array fuel cell. Another purpose thereof is to provide a technique that improves the reliability of a planar fuel cell.

One embodiment of the present invention relates to a composite membrane used for a fuel cell. The composite membrane comprises: a plurality of membrane electrode assemblies, disposed in a planar arrangement, each membrane electrode assembly including an electrolyte membrane, an anode provided on one face of the electrolyte member and a cathode provided on the other face of the electrolyte membrane; and a plurality of interconnectors containing conductive members, each provided on lateral faces of the electrolyte membrane disposed counter to each other in a neighboring direction of the membrane electrode assemblies, wherein the interconnector includes a support portion protruding toward a central region of the electrolyte member on a cathode side of the electrolyte membrane, and wherein the support portion is in contact with a cathode-side surface of an edge of the electrolyte membrane, and the electrolyte membrane is held by the support portion.

Another embodiment of the present invention relates to a fuel cell. This fuel cell has the composite membrane according to the above described embodiment.

Still another embodiment of the present invention relates to a method of making a composite membrane. This method comprises: preparing a conductive base material; forming a plurality of recesses on a first main surface of the conductive base material; depositing an electrolyte solution onto the plurality of recesses formed in the conductive base material; curing the electrolyte solution sufficient to form an electrolyte membrane with an exposed first surface; selectively removing portions of a second main surface of the conductive base material, which opposes the first main surface of the conductive base material, sufficient to expose a second surface of the electrolyte membrane and form a plurality of interconnectors, wherein the interconnectors include: support portions extending; and projections projecting from the support portions and extending partially across the second surface of the electrolyte membrane.

Still another embodiment of the present invention relates to a method of making a fuel cell layer. This method comprises: preparing a composite membrane according to the above-described method; forming an anode catalyst layer by depositing catalyst material on the first surface of the electrolyte membrane; forming a cathode catalyst layer by depositing catalyst material on the second surface of the electrolyte membrane; and partially removing predetermined regions of the anode and cathode catalyst layers, sufficient to segmentalize the catalyst layers.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIGS. 8(i) to 8(iv) are process diagrams showing a fabrication method of a composite membrane used for a fuel cell according to a first embodiment;

FIGS. 10(i) to 10(iv) are process diagrams showing a fabrication method of a composite membrane used for a fuel cell according to a first embodiment;

FIGS. 11(i) to 11(iv) are process diagrams showing a fabrication method of a composite membrane used for a fuel cell according to a first embodiment;

FIG. 12A is a cross-sectional view taken along the line A-A' of FIG. 1; and

FIG. 12B is a cross-sectional view taken along the line B-B' of FIG. 1.

DETAILED DESCRIPTION OF THE INVENTION

The invention will now be described by reference to the preferred embodiments. This does not intend to limit the scope of the present invention, but to exemplify the invention. Note that in all the Figures, the same reference numbers are used to indicate the same or similar component elements and the description thereof is omitted as appropriate.

First Embodiment

Figure 1:
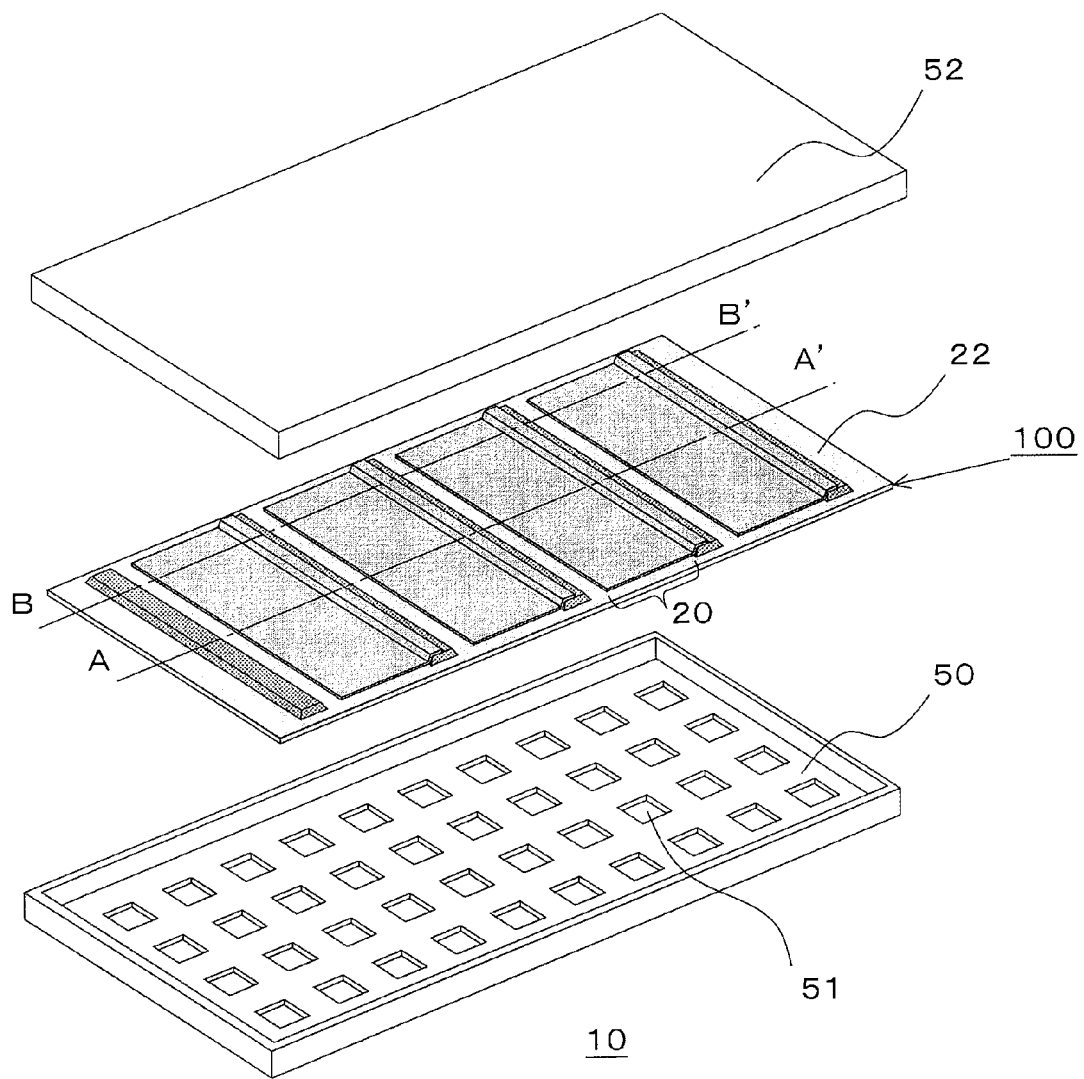
FIG. 1 is an exploded perspective view of a fuel cell according to a first embodiment of the present invention.
Figure 2A:
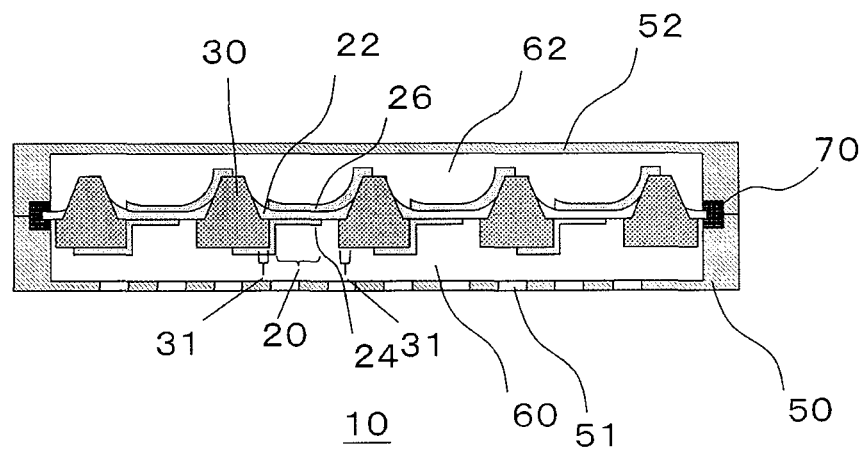
FIG. 2A is a cross-sectional view taken along the line A-A' of FIG. 1.
Figure 2B:
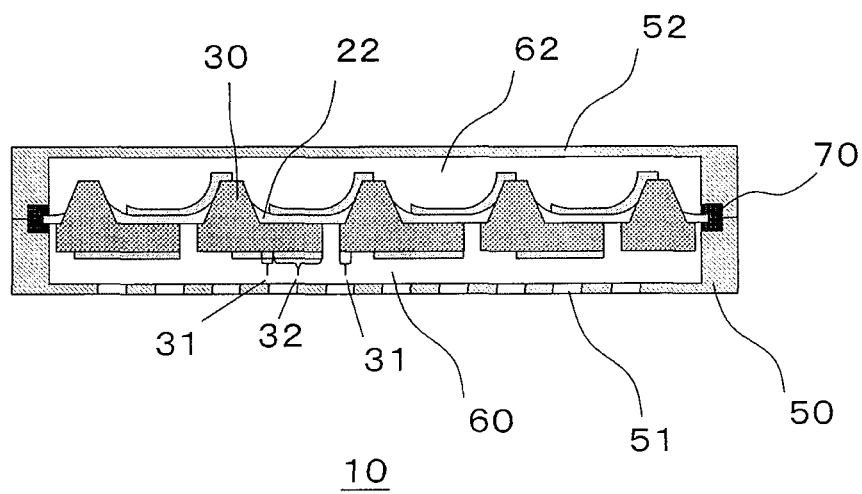
FIG. 2B is a cross-sectional view taken along the line B-B' of FIG. 1.
Figure 3A:
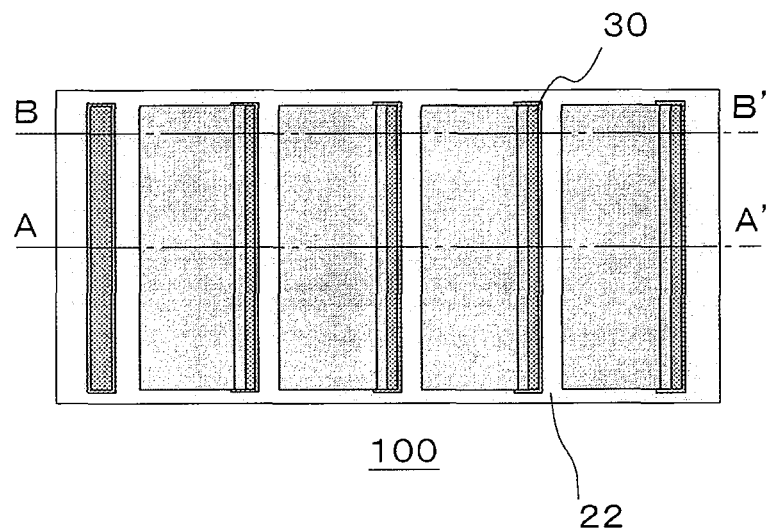
FIG. 3A is a plan view of a composite membrane, on an anode side, used for a fuel cell according to a first embodiment.
Figure 3B:
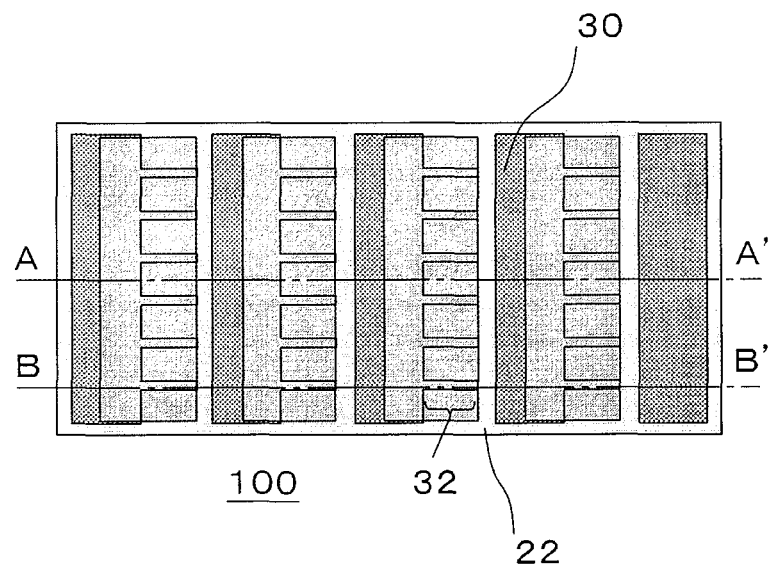
FIG. 3B is a plan view of a composite membrane, on a cathode side, used for a fuel cell according to a first embodiment.

FIG. 1 is an exploded perspective view of a fuel cell according to a first embodiment of the present invention. FIG. 2A is a cross-sectional view thereof taken along the line A-A' of FIG. 1. FIG. 2B is a cross-sectional view thereof taken along the line B-B' of FIG. 1. FIG. 3A is a plan view of an anode side of a composite membrane used for the fuel cell according to the present embodiment. FIG. 3B is a plan view of a cathode side of a composite membrane used for the fuel cell according to the present embodiment. Note that the line B-B' of FIG. 1 corresponds to a forming region on which a projection 32, described later, is formed (See FIG. 3B).

Referring to FIG. 1 and FIGS. 2A and 2B, the fuel cell 10 includes a composite membrane 100, a cathode housing 50 and an anode housing 52.

The composite membrane 100 includes a plurality of membrane electrode assemblies 20 which are disposed in a planar arrangement. Each membrane electrode assembly 20 includes an electrolyte membrane 22, a cathode catalyst layer 24 provided on one face of the electrolyte membrane 22, and an anode catalyst layer 26 provided on the other face of the electrolyte membrane 22. Outer edges of the composite membrane 100 are formed by the electrolyte membrane 22, and a plurality of membrane electrode assemblies 20 are formed inside the outer edges thereof.

The electrolyte membrane 22, which may show excellent ion conductivity in a moist, or humidified, condition, functions as an ion-exchange membrane for the transfer of protons between the cathode layer 24 and the anode layer 26. The electrolyte membrane 22 is formed of a solid polymer material such as a fluorine-containing polymer or a nonfluorine polymer. The material that can be used is, for instance, a sulfonic acid type perfluorocarbon polymer, a polysulfone resin, a perfluorocarbon polymer having a phosphonic acid group or a carboxylic acid group, or the like. An example of the sulfonic acid type perfluorocarbon polymer is Nafion (made by DuPont: registered trademark). Also, an example of the nonfluorine polymer is a sulfonated aromatic polyether ether ketone, polysulfone or the like. The thickness of the electrolyte membrane 22 may be about 10 to 200 μm, for instance.

A plurality of cathode catalyst layers 24, which function as cathodes, are formed on one face of the electrolyte membrane 22 in such a manner as to be slightly apart from each other. Air may be supplied to the cathode catalyst layers 24 as oxidant. A plurality of anode catalyst layers 26, which function as anodes, are formed on the other face of the electrolyte membrane 22 in such a manner as to be slightly apart from each other. Hydrogen may be supplied to the anode catalyst layers 26 as fuel gas. Although the embodiments described contemplate using hydrogen gas as fuel, it is to be understood that any other suitable fuels may be used, such as methanol, formic acid, butane, or other hydrogen carriers, for example. A single cell is structured by a pair of anode catalyst layer 24 and cathode catalyst layer 26 with the electrolyte membrane 22 held between the anode catalyst layer 24 and the cathode catalyst layer 26. Each single cell generates electric power through an electrochemical reaction between the fuel, (e.g. hydrogen) and oxygen in the air.

The cathode catalyst layer 24 and the anode catalyst layer 26 are each provided with ion-exchange material and catalyst particles or carbon particles as the case may be. The ion-exchange material provided in the cathode catalyst layer 24 and the anode catalyst layer 26 may be used to promote adhesion between the catalyst particles and the electrolyte membrane 22. This ion-exchange material may also play a role of transferring protons between the catalyst particles and the electrolyte membrane 22. The ion-exchange resin may be formed of a polymer material similar to that of the electrolyte membrane 22. A catalyst metal may be a single element or an alloy of two or more elements selected from among Sc, Y, Ti, Zr, V, Nb, Fe, Co, Ni, Ru, Rh, Pd, Pt, Os, Ir, lanthanide series element, and actinide series element. Furnace black, acetylene black, ketjen black, carbon nanotube or the like may be used as the carbon particle when a catalyst is to be supported. The thickness of the cathode catalyst layer 24 and the anode catalyst layer 26 may be from about 10 to 40 μm, for instance.

In this manner, the fuel cell 10 according to the present embodiment comprises a plurality of membrane electrode assemblies (single cells) 20, in a planar arrangement, which are composed of the respective pairs of the cathode catalyst layers 24 and the anode catalyst layers 26 wherein the electrolyte membrane 22 is interposed between the cathode catalyst layer 24 and the anode catalyst layer 26.

A plurality of interconnectors (conductive members) 30 are each provided on lateral faces of the electrolyte membrane 22 disposed counter to each other in a neighboring direction of the membrane electrode assemblies 20. Examples of a material to induce conductivity of the interconnector 30 include a carbon-based material, such as carbon fiber, graphite sheet, carbon paper or carbon power, and a metallic material, such as platinum, gold, stainless steel, titanium or nickel.

In the present embodiment, the upper surface of the interconnector 30 is protruded on an anode side of the electrolyte membrane 22, and the upper surface (anode-side surface) of the interconnector 30 may be coplanar with an anode-side surface of the electrolyte membrane 22.

Figure 4:
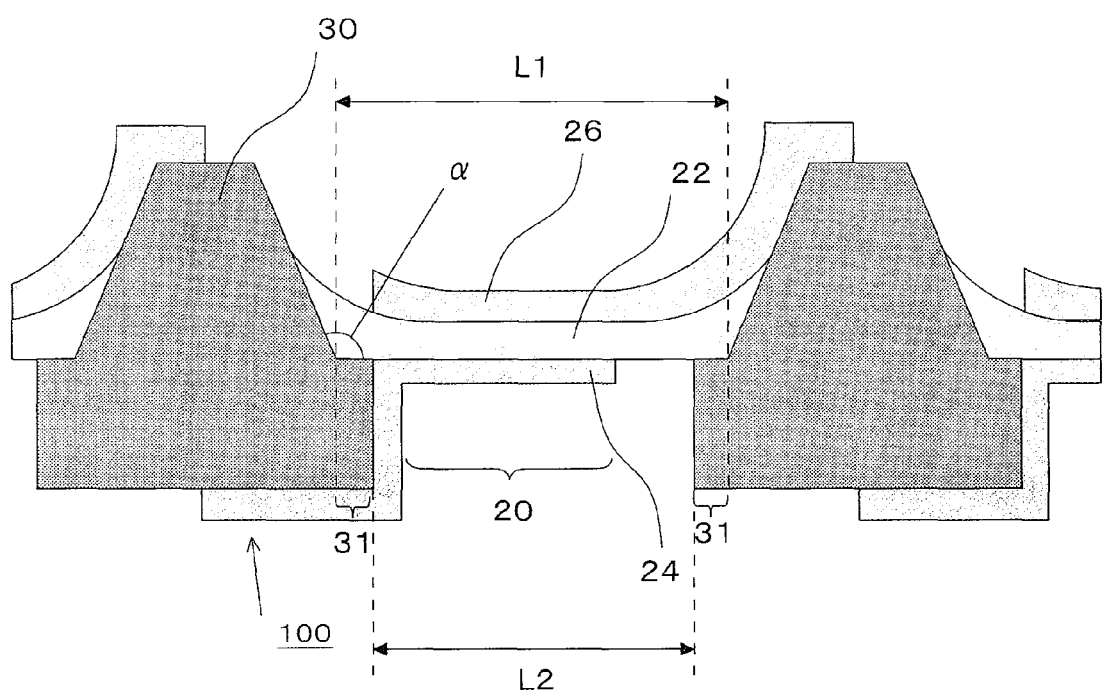
FIG. 4 is a feature sectional view illustrating a structure of a membrane electrode assembly and an interconnector.

FIG. 4 is a feature sectional view illustrating a structure of the membrane electrode assembly 20 and the interconnector 30.

As shown in FIG. 4, the interconnector 30 has a support portion 31 extending and protruding toward a central region of the electrolyte membrane 22 on the cathode side of the electrolyte membrane 22. The support portion 31 is in contact with a cathode-side surface of an edge of the electrolyte membrane 22, and the electrolyte membrane 22 is held by the support portion 31. The support portion is not necessarily symmetrical bilaterally with respect to the central region of the electrolyte membrane 22. Where the length of an anode-side opening is denoted by "L1" and the length of a cathode-side opening is "L2", it may be preferable that $0.666 < L2/L1 < 1$.

The interconnector 30, provided between the adjacent membrane electrode assemblies 20, connects electrically the cathode catalyst layer 24 of one of the adjacent membrane electrode assemblies 20 to an anode catalyst layer 26 of the other thereof. More specifically, the cathode catalyst layer 24 may extend to one of a pair of interconnectors 30 disposed counter to each other on the lateral faces of the electrolyte membrane 22, and the cathode catalyst layer 24 is electrically connected to the one of the interconnectors 30. Also, the anode catalyst layer 26 extends to the other of a pair of interconnectors 30 disposed counter to each other on the lateral faces of the electrolyte membrane 22, and the anode catalyst layer 26 is electrically connected to the other of the interconnectors 30. This arrangement enables the adjacent membrane electrode assemblies (single cells) 20 to be connected in series with each other, and consequently a plurality of membrane electrode assemblies 20 disposed in a planar arrangement are electrically connected in series. In another embodiment, the arrangement of anode and/or cathode catalyst layers may be adjusted to provide a plurality of membrane electrode assemblies which may be electrically connected in parallel, or in some combination of series and parallel.

As shown in FIG. 4, in the present embodiment, the electrolyte membrane 22 extends along lateral sides of the interconnectors 30. This arrangement increases the contact area between the electrolyte membrane 22 and the interconnector 30 because the electrolyte membrane 22 is also in contact with portions of the interconnector 30 other than the support portion 31 thereof. An angle α formed between an electrolyte membrane 22 side surface of the support portion 31 and a lateral face of the interconnector 30 in contact with a lateral face of the electrolyte membrane 22 may be greater than 90 degrees. This arrangement may further promote adhesion or contact between the electrolyte membrane 22 and the portion of the interconnector 30 other than the support portion 31 thereof.

Figure 5:
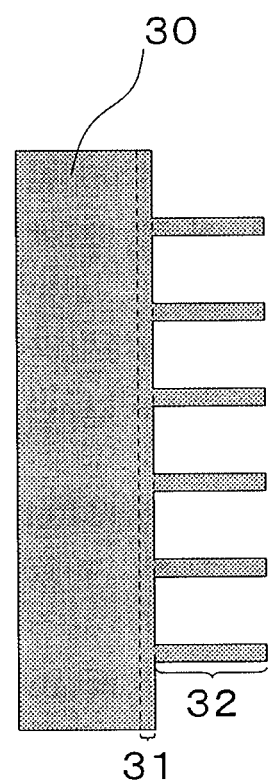
FIG. 5 is a planar view of an interconnector as viewed from a cathode side.

FIG. 5 is a planar view of an interconnector 30 according to some embodiments as viewed from a cathode side. A pair of interconnectors 30 are disposed counter to each other on the lateral faces of the electrolyte membrane 22, a portion of interconnector 30 connected to the cathode catalyst layer 24 has a projection 32 projecting from the aforementioned support portion 31 to further support a cathode-side surface of the electrolyte membrane 22 in such a manner that the projection 32 projecting therefrom does not come in contact with the adjacent interconnector 30. In the present embodiment, a plurality of projections 32 are provided at predetermined intervals, and are formed in such a manner as to resemble the teeth of a comb. If the size of a single cell is about 60 mm×2 mm, the length of the projection 32 may be about 500 to 1500 μm, the width thereof may be about 100 to 1000 μm, and the number of projections 32 may be about 5 to 20, for instance. The total area of the projections 32 may be 10% or less than the total area of a cell.

Now, refer back to FIGS. 2A and 2B. The cathode housing 50 may constitute a part of a casing of the fuel cell 10 and may be placed adjacent to the cathode catalyst layer 24. The cathode housing 50 may be provided with air inlets 51 for feeding air from outside. An air chamber 60 where the air flows may be formed between the cathode housing 50 and the cathode catalyst layer 24. The pressure of the air in the air chamber 60 may be the same as the atmospheric pressure.

Similarly, the anode housing 52 may constitute a part of the casing of the fuel cell 10 and may be placed adjacent to the anode catalyst layer 26. A fuel gas chamber 62 for storing the fuel may be formed between the anode housing 52 and the anode catalyst layer 26. A fuel supply port (not shown) may be formed in the anode housing 52, so that the fuel can be supplied as needed from a fuel cartridge or the like. The pressure of the fuel gas in the fuel gas chamber 62 may be maintained at a level higher than the atmospheric pressure.

The material used for the cathode housing 50 and the anode housing 52 may be a commonly-used plastic resin such as phenol resin, vinyl resin, polyethylene resin, polypropylene resin, polystyrene resin, urea resin or fluororesin.

The cathode housing 50 and the anode housing 52 may be fastened to each other by fasteners (not shown), such as bolts and nuts, via gaskets 70. The fasteners giving pressure to the gaskets 70 may improve the sealing performance of the gaskets 70.

By employing the fuel cell 10 as described above, the edge of the electrolyte membrane 22 may be supported by the support portion 31 of the interconnector 30 from the cathode side. Thus, the electrolyte membrane 22 may be less likely to be deformed and fractured even if the pressure of the fuel gas in the fuel gas chamber 62 rises and a pressure is applied to the electrolyte membrane 22. Hence, the reliability of the planar fuel cell 10 may be improved. In some embodiments (not shown), it may be possible to form a fuel cell layer which is not clamped between an anode housing and cathode housing affixed to the fuel cell layer using fasteners. For example the fuel cell layer may be bonded directly to a fuel plenum, through use of adhesives or internal bonding components, such as those disclosed in U.S. Patent Application Publication Number 2009/0081493, the disclosure of which is herein incorporated by reference in its entirety, instead of through the use of fasteners. In such embodiments, outer edges of the composite membrane may be formed by the electrolyte membrane, or may be formed from other materials, such as the interconnectors or a support material, for example. In such embodiments, the fuel cell layer may not have a cathode housing, or may have a cathode housing which may be either fastened or bonded to the fuel cell layer. In this way, the cathode housing may or may not be used to provide additional support for the fuel cell layer.

The projection 32 extends and protrudes from the support portion 31 thereof toward the central region of the electrolyte membrane 22, thereby increasing the area of the electrolyte membrane 22 supported by the interconnector 30. Hence, the reliability of the fuel cell 10 can be further improved. Also, the projections 32 function as current collecting members, so that the conductivity of the cell on the cathode side can be improved and consequently the internal resistance of the fuel cell 10 can be reduced.

Fabrication Method of Composite Membrane

Figure 6A:
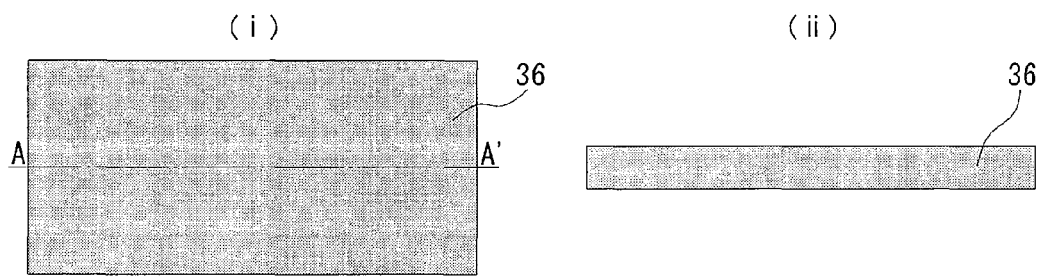
FIGS. 6A(i) to 6B(ii) are process diagrams showing a fabrication method of a fuel cell used for a fuel cell according to a first embodiment.

A method for manufacturing a composite membrane 100 according to the first embodiment will now be described with reference to FIG. 6A(i) to FIG. 11(iv). FIG. 6A(i) to FIG. 11(iv) are process diagrams showing a method for manufacturing a membrane electrode assembly 20 according to the first embodiment. In FIGS. 6A(i) to 6B(ii) and FIGS. 7A(i) to 7B(ii), diagrams on the left (i) show anode-side plan views whereas those on the right (ii) show cross-sectional views taken along the line A-A of the respective anode-side plan views. In FIGS. 8(i) to 8(iv) and FIGS. 11(i) to FIG. 11(iv), diagrams on the left (i) and (iii) show an anode-side plan view and a cathode-side plan view, respectively, whereas those on the right (ii) and (iv) show a cross-sectional view taken along the line A-A of the anode-side plan view and a cross-sectional view taken along the line A-A of the cathode-side plan view, respectively.

As shown in FIGS. 6A(i) and 6A(ii), a conductive base material 36 is first prepared. The film thickness of the conductive base material 36 is about 10 μm to about 1000 μm, for instance. For example, a plate-like carbon film or a carbon plate may be used as the conductive base material 36. For example, an expanded graphite excelling in flexibility may be preferably used as a carbon material.

Figure 6B:
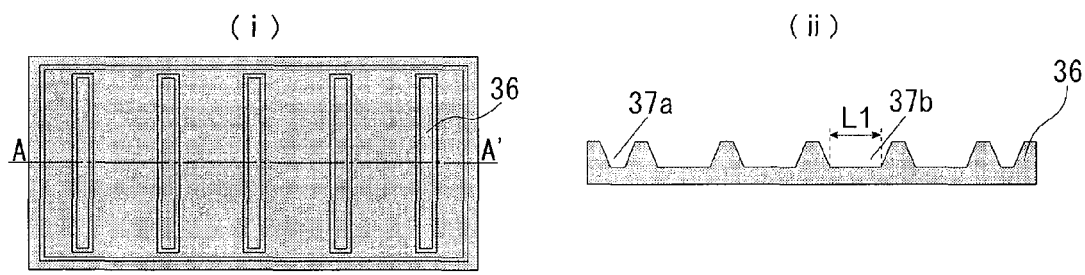

Then, as shown in FIGS. 6B(i) and 6B(ii), recesses are formed on one main surface of the conductive base material 36 (i.e., the surface thereof on an anode side). The method for forming the recesses is not limited to any particular one. For example, the recesses may be formed by pressurization and compression using a metallic mold. There are two kinds of recesses 37a and 37b in the recesses 37 formed here. The recesses 37a are portions formed along the edges of the conductive base material 36 in such a manner that parts of the edges of the conductive base material 36 are left intact. In a region surrounded by these recesses 37a, the recesses 37b are placed side by side wherein the recesses 37b are each divided by the conductive base materials 36. The width of the base of each recess 37b divided by the conducive base material 36 is denoted by "L1" (See FIG. 6B(ii)). The side surface of the recess 37b is tapered, and such a shape may be achieved by designing the shape of a metallic mold when the metallic mold is used.

Figure 7A:
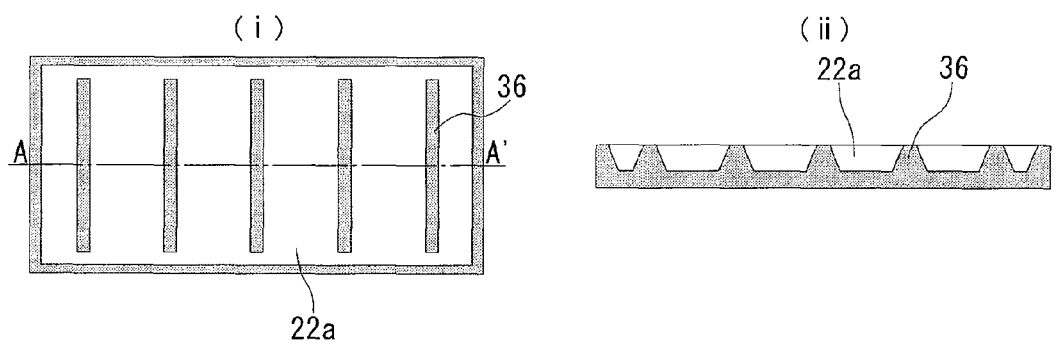
FIGS. 7A(i) to 7B(ii) are process diagrams showing a fabrication method of a composite membrane used for a fuel cell according to a first embodiment.
Figure 8:
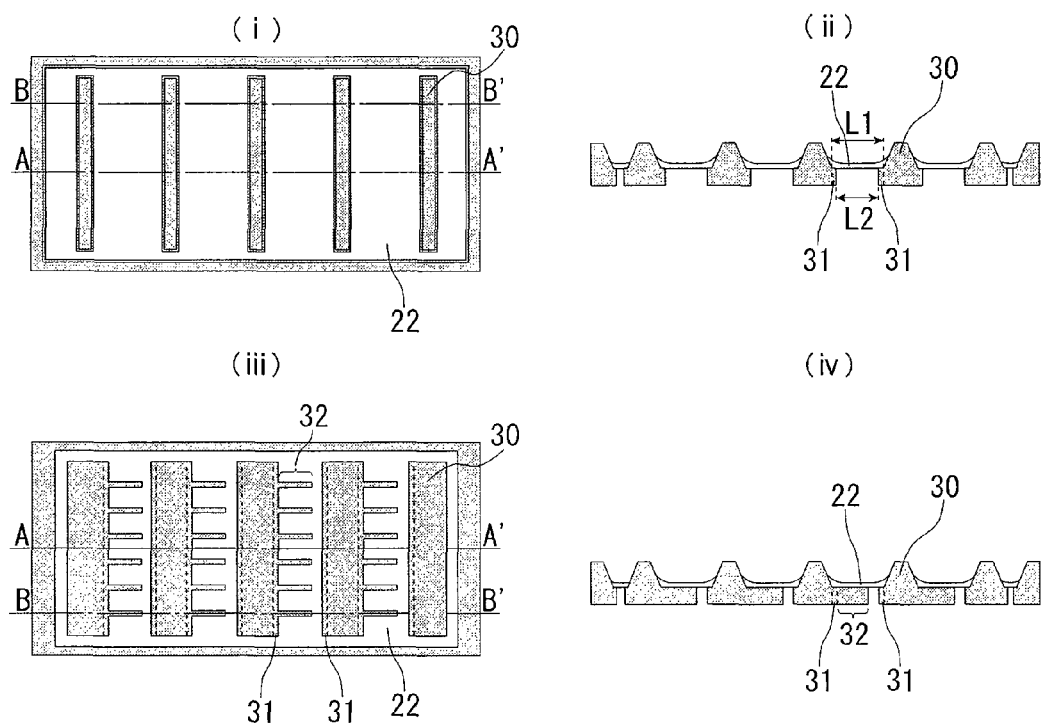

Then, as shown in FIGS. 7A(i) and 7A(ii), an electrolyte solution 22a (e.g., Nafion solution: 20 parts by weight of Nafion and 80 parts by weight of solvent) is deposited onto the recesses formed in the conductive base material 36. In so doing, the deposited quantity of electrolyte solution 22a may be controlled so that the main surface of the conductive base material 36 (top surface thereof formed in a protruding manner) which is a part thereof other than the recesses 37 is at least exposed.

Figure 7B:
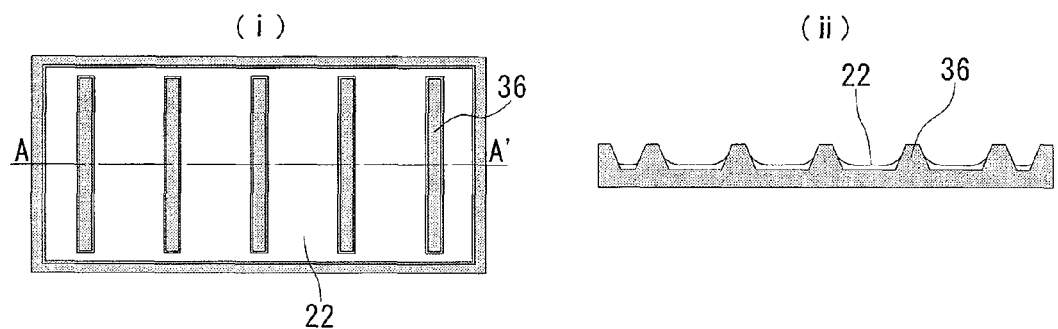

Then, as shown in FIGS. 7B(i) and 7B(ii), the solvent contained in the electrolyte solution is dried and removed, and an electrolyte membrane 22 is formed by subjecting it to the heat treatment. The meniscus shape determined by the surface tension of electrolyte solution during a drying process may be reflected in the electrolyte membrane 22.

Then, as shown in FIGS. 8(i) to 8(iv), the other main surface of the conductive base material 36 (i.e., the surface thereof on a cathode side) may be selectively removed, using an appropriate method, such as the laser processing for example, in such a manner that the electrolyte membrane 22 is exposed. In this manner, the interconnectors 30 are formed. As shown in FIG. 8(ii), the support portion 31 of the interconnector 30 is formed by processing the conductive base material 36 in such a manner that a width L2 of the exposed surface of the electrolyte membrane 22 on the cathode side is smaller than the width L1 of the base of the recess 37b. As shown in FIGS. 8(iii) and 8(iv), formed are projections 32 each projecting from the support portion 31 to further support the cathode-side surface of the electrolyte membrane 22 in such a manner that the projection 32 projecting therefrom does not come in contact with the adjacent interconnector 30.

In embodiments where laser processing is used to selectively remove the conductive base material, a laser may be directed toward the conductive base material from the cathode side thereof. However, if laser light transmits through the electrolyte membrane 22, a laser also may be directed toward the conductive base material from the anode side thereof.

Figure 9:
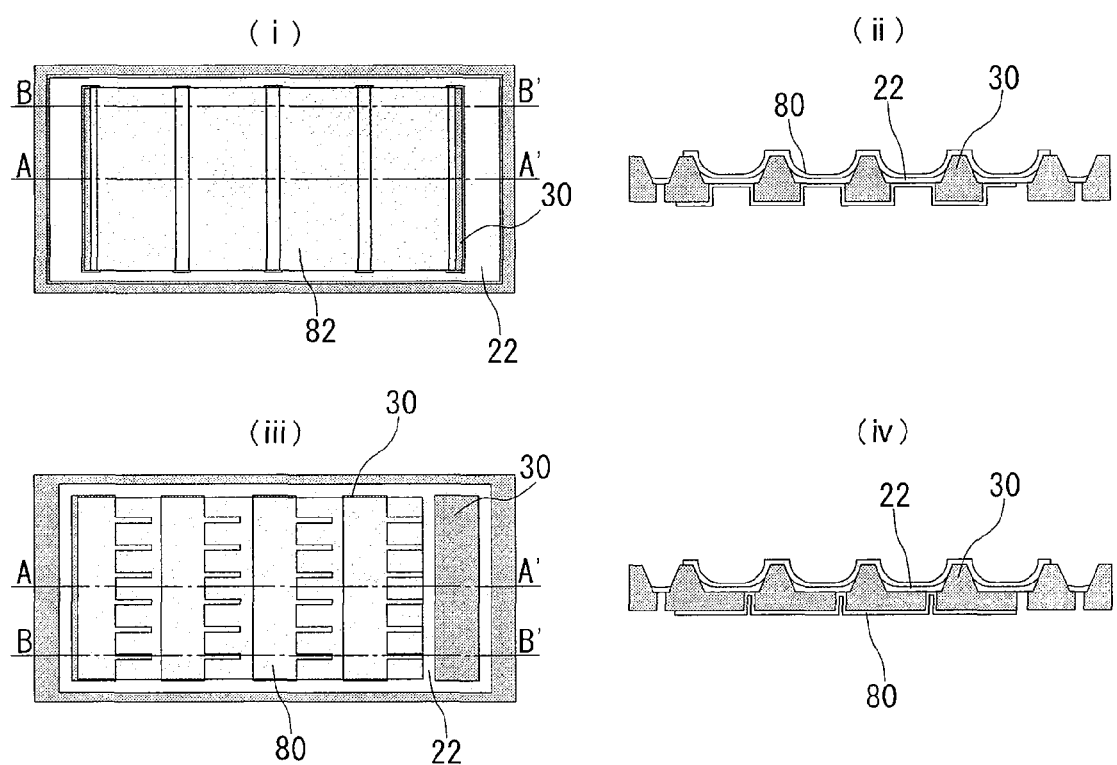
FIGS. 9(i) to 9B(iv) are process diagrams showing a fabrication method of a composite membrane used for a fuel cell according to a first embodiment.

Then, as shown in FIGS. 9(i) to 9(iv), at the anode side of the electrolyte membrane 22, an anode catalyst layer 26 is so formed as to lie across a plurality of electrolyte membranes 22. In an example embodiment, a catalyst slurry may be formed by mixing water of 10 g, Nafion solution of 5 g, platinum black or platinum-supported carbon of 5 g, and 1-propanol of 5 g. In this example embodiment, the anode catalyst layer 26 may be formed by spray-coating the aforementioned catalyst slurry. Similarly, at the cathode side of the electrolyte membrane 22, a cathode catalyst layer 24 may be so formed as to lie across a plurality of electrolyte membranes 22, for example by spray-coating the above-described catalyst slurry. The thickness of a catalyst layer 80 and a catalyst layer 82 may be about 10 to 40 μm, for instance.

Figure 10:
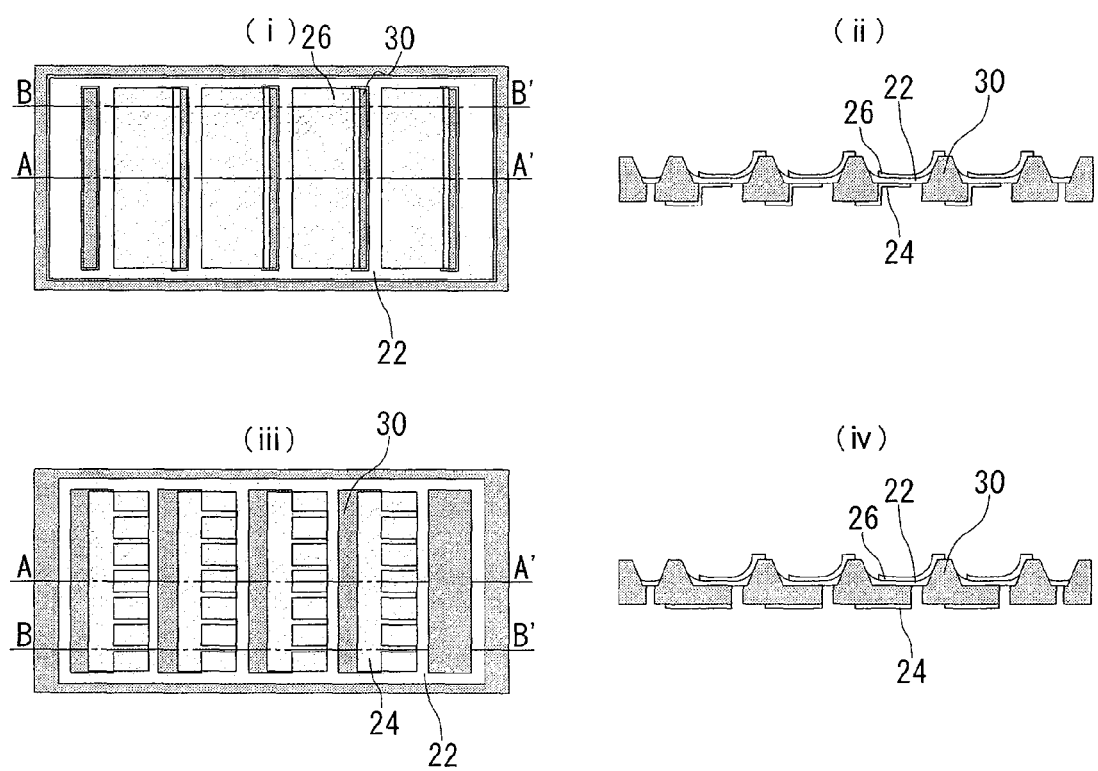

Next, as shown in FIGS. 10(i) to 10(iv), a predetermined region of the anode catalyst layer 26 may be partially removed. The predetermined region may be partially removed using any suitable mechanical or chemical process, for example mechanical scraping, chemical etching, abrasion, micro-abrasion or laser processing, such as excimer laser. This partial removal of the predetermined regions segmentalizes the anode catalyst layer 26 and partially exposes the electrolyte membrane 22. For example, the predetermined region of the anode catalyst layer 26 to be partially removed may be a region, in the electrolyte membrane segmentalized by a pair of interconnectors 30, corresponding to an end of the electrolyte membrane 22 being in contact with one of the interconnectors 30. In this example embodiment, the one of the interconnectors 30 is the interconnector 30 having the projections 32 that support the cathode side of the electrolyte membrane to be processed.

Also, a predetermined region of the cathode catalyst layer 24 is partially removed using any suitable mechanical or chemical process, such as those described for partial removal of the anode catalyst layer, above. This partial removal of the predetermined regions segmentalizes the cathode catalyst layer 24 and partially exposes the electrolyte membrane 22. In this example embodiment, the predetermined region of the cathode catalyst layer 24 to be partially removed may be a region, in the electrolyte membrane segmentalized by a pair of interconnectors 30, corresponding to an end of the electrolyte membrane 22 being in contact with the other of the interconnectors 30.

Figure 11:
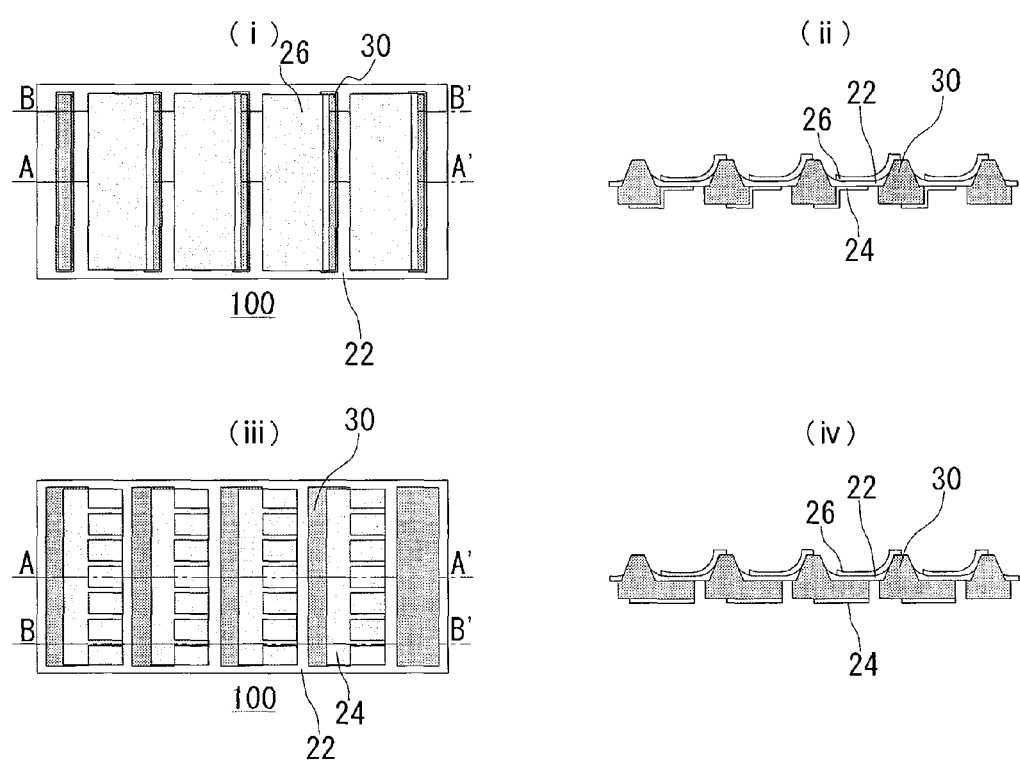

Then, as shown in FIGS. 11(i) to 11(iv), the edges of the conductive base material 36 may be removed, so that the composite membrane 100 according to the first embodiment is manufactured. Though in the above-described processes the anode and the cathode are subjected to the similar process in each process and then a subsequent process is performed, the anode may be first subjected to a series of processes and then the cathode may be subjected to a series of processes.

Second Embodiment

Figure 12A:
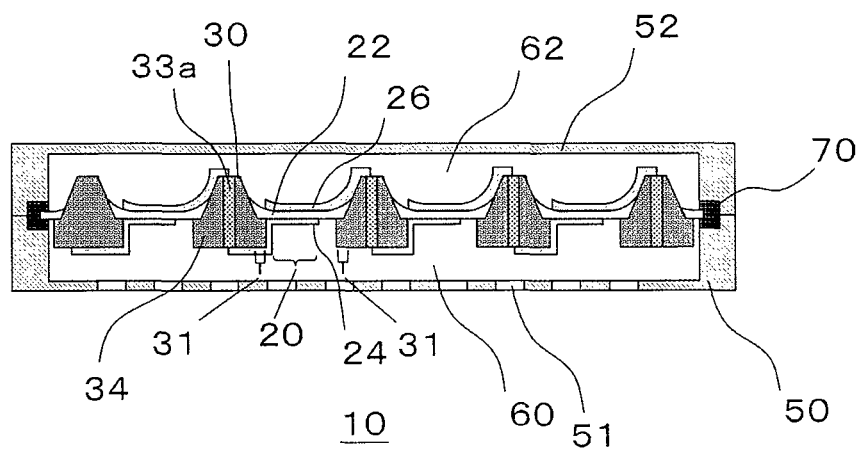
FIGS. 12A and 12B are cross-sectional views showing a structure of a fuel cell according to a second embodiment of the present invention.
Figure 12B:
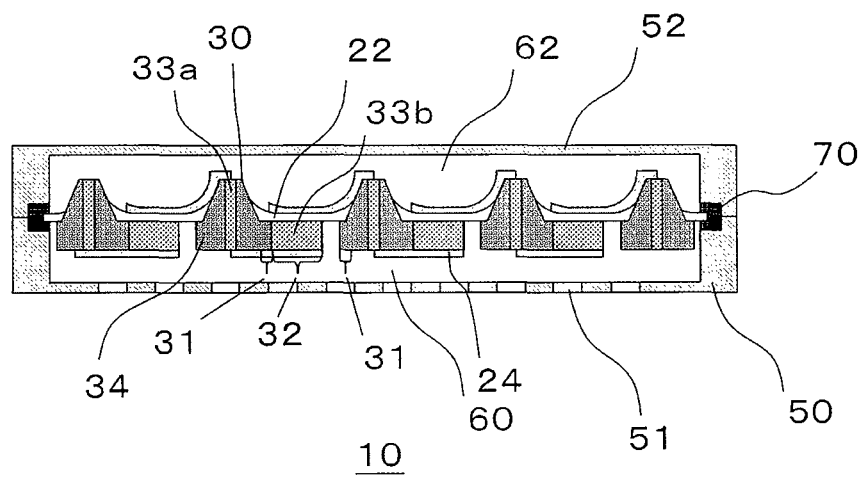

FIGS. 12A and 12B are cross-sectional views showing a structure of a fuel cell according to a second embodiment of the present invention. FIG. 12A is a cross-sectional view taken along the line A-A' of FIG. 1. FIG. 12B is a cross-sectional view taken along the line B-B' of FIG. 1. A fuel cell 10 according to the second embodiment of the present invention has the same structure as that of the first embodiment with the exception of an interconnector 30. Hence, a description of components identical to those of the first embodiment will be omitted.

In the present embodiment, the interconnector 30 may be formed by a composite member made of an insulating member 34 and conductive members 33a and 33b, such as those described in PCT Patent Application PCT/CA2009/000253, the disclosure of which is herein incorporated by reference in its entirety. In the present embodiment, portions of the interconnector 30, which are in contact with the electrolyte membrane 22 and the anode catalyst layer 26, and a support portion of the interconnector 30 are formed by the insulating members 34. The material used for the insulating member 34 may be a glass-based material, such as glass fibers, a resin material, such as epoxy resin, phenol resin, vinyl resin, polyethylene resin, polypropylene resin, polystyrene resin, urea resin or fluororesin, or the like. The insulating member 34 may further comprise filler materials, for example a glass-based material, such as glass fibers, or a resin material, such as polypropylene resin.

The conductive member 33a penetrates the insulating member 34 and is exposed on an anode side and a cathode side of the interconnector 30, respectively. The cathode catalyst layer 24 extends to one of a pair of interconnectors 30 disposed counter to each other on the lateral faces of the electrolyte membrane 22. And the cathode catalyst layer 24 is electrically connected to the conductive member 33a contained in the one of the interconnectors 30. Also, the anode catalyst layer 26 extends to the other of a pair of interconnectors 30 disposed counter to each other on the lateral faces of the electrolyte membrane 22. And the anode catalyst layer 26 is electrically connected to the conductive member 33a contained in the other of the interconnectors 30. This arrangement enables the adjacent membrane electrode assemblies (single cells) 20 to be connected in series with each other, and consequently a plurality of membrane electrode assemblies 20 disposed in a planar arrangement are connected in series.

The conductive member 33b, which is formed in a region corresponding to the projection 32 (described in the first embodiment), may contribute to an improved current collecting property and may also provide support for the cathode-side surface of the electrolyte membrane 22.

The fuel cell 10 structured according to the second embodiment also achieves the same advantageous effects as those achieved by the fuel cell 10 according to the first embodiment.

The present invention is not limited to the above-described embodiments only, and it is understood by those skilled in the art that various modifications such as changes in design may be made based on their knowledge and the embodiments added with such modifications are also within the scope of the present invention.

For example, in the method for manufacturing the composite membrane according to the above-described first embodiment, a catalyst layer may be so applied as to lie across a plurality of electrolyte membranes before the unwanted portions are removed. In a modification, masks may be placed on the unwanted portions before the catalyst layer is applied.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:

1. A composite membrane, comprising:
    a plurality of membrane electrode assemblies, disposed in a planar arrangement, each membrane electrode assembly including an electrolyte membrane, an anode provided on one face of the electrolyte membrane and a cathode provided on the other face of the electrolyte membrane; and
    a plurality of interconnectors containing conductive members, each one provided on lateral faces of the electrolyte membrane disposed counter to each other in a neighboring direction of said membrane electrode assemblies,
    wherein said interconnector includes a support portion protruding toward a central region of the electrolyte membrane on a cathode side of the electrolyte membrane,
    wherein the support portion is in contact with a cathode-side surface of an edge of the electrolyte membrane, and the electrolyte membrane is held by the support portion, and
    wherein an angle α formed between an electrolyte-membrane-face-side surface of the support portion and a lateral face of said interconnector in contact with the lateral face of the electrolyte membrane is greater than 90 degrees.

2. A composite membrane according to claim 1, wherein the anode extends to one of said interconnectors provided on the lateral faces of the electrolyte membrane disposed counter to each other, and the anode is electrically connected to the one of said interconnectors, and
    wherein the cathode extends to the other of said interconnectors provided on the lateral faces of the electrolyte membrane disposed counter to each other, and the cathode is electrically connected to the conductive member contained in the other of the interconnectors.

3. A composite membrane according to claim 1, wherein the other of said interconnectors has a projection projecting from the support member to further support a cathode-side surface of the electrolyte membrane in such a manner that the projection projecting therefrom does not come in contact with the one of said interconnectors.

4. A composite membrane according to claim 2, wherein the other of said interconnectors has a projection projecting from the support member to further support a cathode-side surface of the electrolyte membrane in such a manner that the projection projecting therefrom does not come in contact with the one of said interconnectors.

5. A composite membrane according to claim 1, wherein the electrolyte membrane extends along a lateral face of said interconnector.

6. A composite membrane according to claim 2, wherein the electrolyte membrane extends along a lateral face of said interconnector.

7. A composite membrane according to claim 3, wherein the electrolyte membrane extends along a lateral face of said interconnector.

8. A fuel cell having a composite membrane according to claim 1.

9. A fuel cell having a composite membrane according to claim 2.

10. A fuel cell having a composite membrane according to claim 3.

11. A fuel cell having a composite membrane according to claim 5.

12. A composite membrane according to claim 1, wherein the plurality of interconnectors are formed by a composite member comprising insulating members disposed adjacent to the conductive members.

13. A fuel cell having a composite membrane according to claim 12.

* * * * *

UNITED STATES PATENT AND TRADEMARK OFFICE
CERTIFICATE OF CORRECTION

PATENT NO. : 8,530,108 B2
APPLICATION NO. : 12/703033
DATED : September 10, 2013
INVENTOR(S) : Kabumoto et al.

It is certified that error appears in the above-identified patent and that said Letters Patent is hereby corrected as shown below:

On the Title page, in Item (73), in "Assignee", in column 1, line 1, delete "(FR)" and insert --(FR); Sanyo Electric Co., LTD., Osaka (JP)--, therefor In the Specification In column 4, line 16, delete "anode" and insert --cathode--, therefor In column 4, line 17, delete "cathode" and insert --anode--, therefor In column 4, line 18, delete "anode" and insert --cathode--, therefor In column 4, line 18, delete "cathode" and insert --anode--, therefor In column 7, line 28, delete "conducive" and insert --conductive--, therefor Signed and Sealed this
First Day of April, 2014

Michelle K. Lee
*Deputy Director of the United States Patent and Trademark Office*